(12) United States Patent
Yang

(10) Patent No.: US 6,573,999 B1
(45) Date of Patent: Jun. 3, 2003

(54) FILM THICKNESS MEASUREMENTS USING LIGHT ABSORPTION

(75) Inventor: Feng Yang, San Jose, CA (US)

(73) Assignee: Nanometrics Incorporated, Milpitas, CA (US)

( * ) Notice: Subject to any disclaimer, the term of this patent is extended or adjusted under 35 U.S.C. 154(b) by 348 days.

(21) Appl. No.: 09/615,964

(22) Filed: Jul. 14, 2000

(51) Int. Cl.$^7$ .......................... G01B 11/05; G01B 11/28
(52) U.S. Cl. ...................... 356/632; 356/630
(58) Field of Search .............................. 356/630, 632, 356/443, 444, 445, 332, 57; 250/559.28

(56) References Cited

U.S. PATENT DOCUMENTS

| | | | |
|---|---|---|---|
| 4,243,882 A | 1/1981 | Yasujima et al. | 250/339 |
| 4,421,983 A | 12/1983 | Fogle et al. | 250/339 |
| 4,707,611 A * | 11/1987 | Southwell | 250/559.28 |
| 4,984,894 A * | 1/1991 | Kondo | 250/372 |
| 5,250,811 A | 10/1993 | Lippert et al. | 250/339 |
| 5,416,594 A * | 5/1995 | Gross et al. | 356/237.5 |
| 5,851,842 A | 12/1998 | Katsumata et al. | 438/9 |
| 6,204,922 B1 | 3/2001 | Chalmers | 356/381 |

FOREIGN PATENT DOCUMENTS

EP  0 548 582 B1  9/1995

OTHER PUBLICATIONS

Boal, et al., "Meaurements of the thickness of thin oxide films and tin nitride films in silicon by infra–red absorption", Solid–State Electronics An International Journal, vol. 25, No. 9, pp. 968–970 (Sep. 1982).

Bourget, et al., "In situ film thickness measurement and gaseous species detection in diamond CVD processes using FTIR emission spectroscopy", Surface and Coatings Technology, 21$^{st}$ International Conference on Metallurgical Coatings and Thin Films, vol. 68/69, pp. 394–397 (Apr. 25–29, 1994).

Lee, et al., "Thickness measurement of titanium and titanium silicide films by infrared transmission", J. Vac. Sci. Technol. B6(5), pp. 1533–1536 (Sep./Oct. 1988).

Low, et al., "Infrared Fourier Transform Spectroscopy In the Coatings Industry V. Measurement of Thicknesses of Films of Clear on Reflective Metals", Journal of Paint Technology, vol. 46, No. 594, pp. 65–68 (Jul. 1974).

Mogab, "Measurement of Film Thickness from Lattice Absorption Bands", Journal of the Electrochemical Society, vol. 120, No. 7, pp. 932–937 (Jul. 1973).

Wang, et al., "New correction method for FTIR on–line film thickness measurement", SPIE, vol. 2857, pp. 12–16 (Aug. 8, 1996).

* cited by examiner

Primary Examiner—Georgia Epps
Assistant Examiner—Jack Dinh
(74) Attorney, Agent, or Firm—Silicon Valley Patent Group LLP; Michael J. Halbert

(57) ABSTRACT

A method of measuring film thickness is based on the film's attenuation of optical characteristics, such as absorption band or absorption bands, of underlying material. The thickness of the film is determined based on a correlation between the thickness of the film and the strength of the absorption band (such as a peak or valley area) of the underlying material. The correlation is generated using an identified absorption band of the underlying material, which may be determined empirically or using a library of information, and the reflectance spectra produced by calibration samples, each having a different thickness of film.

14 Claims, 4 Drawing Sheets

FILM THICKNESS MEASUREMENTS USING LIGHT ABSORPTION

FIELD OF THE INVENTION

The present invention relates to the measurement of a film thickness and in particular to a method of the measurement of thin film thickness using light.

BACKGROUND

The use of light to measure the thickness of a film, e.g., a film that overlies a substrate during the production of an integrated circuit or flat panel display, is well known. For example, Fourier Transform Infrared (FTIR) spectrometers operating in the infrared (IR) wavelength range is a well-known metrology tool useful in a variety of scientific or technological fields, for example, biology, geology, forensics, nutrition science, medicine, and semiconductor processing.

A Fourier Transform Infrared (FTIR) spectrometer typically uses a Michelson interferometer, which includes an IR source, a beam splitter, and two plane mirrors (one fixed and one moving) and after mathematical processing, produces a spectrum of the light coming from the sample. A FTIR spectrometer detects the absorption of the IR light that is either passed through or reflected by the sample. In the IR range, absorption of light is associated with chemical bonds in molecular structures and, thus, valuable compositional information can be obtained. Because the spectrum variations can also be caused by interference effects of light reflecting from different interfaces, film-thickness information can also be extracted. Examples of FTIR spectrometers are the Century Series FT-IR Spectrometers made by Bio-Rad located in Cambridge, Mass., the Epitaxial Layer Thickness Monitor MappIR by PIKE Technologies, located in Madison Wis., the MB Series of FTIR Spectrometers by Bomem, located in Quebec, Canada, the Genesis Series FTIR by Mattson, located in Madison, Wis., the M-Research Series and SPR Prospect IR spectrometer by Midac Corporation, located in Irvine Calif.

There are multiple conventional methods to extract layer thickness from a mid-IR spectrum (2.5 $\mu$m to 25 $\mu$m). One method is based on interference phenomena, which results from the constructive and destructive interference that occurs at different wavelengths between the reflection at the top surface of a layer and the successive reflection at bottom surface of the layer. By curve-fitting this spectrum over a wide range, the thickness of the layer may be determined. This method requires that two prerequisites be satisfied. First, the layer to be measured must be partially transparent. Second, the optical constant dispersion of the layer and substrate needs to be pre-determined or expressed as a known function of the wavelength. Due to the complexity of optical responses from a variety of materials in the mid-IR spectral region, it may take an enormous analysis effort and consume a large amount of time in order to determine the optical constants of the material.

Another conventional method is based on empirical calibration of the IR transmittance. In this method, the transmittance at a wavelength or transmittance spectrum over a band of wavelengths is measured. The material absorbs the infrared light at those wavelengths. The thickness of the material can be determined by interpolating the measured transmittance according to a standard set of transmittance values of a series of known thickness samples. The general principle behind the second method is to have a set of standard samples (called calibration set) of known thickness values determined using an independent means of thickness measurement from which can be generated a calibration table which correlates measured thickness values from the calibration set to IR transmittance values. As long as an unambiguous correlation can be established between thickness and IR transmittance, thickness of any thin film can be determined using this calibration method.

In the calibration method, the thickness of a film is determined by monitoring the attenuation of the transmitted light intensity by the film being tested at a predetermined wavelength. The attenuation is caused by the absorption of the light by the material of the film being tested and is related to the thickness of the film through Lambert's law, which is $I=I_0 e^{-\alpha z}$, where z is the distance light travels inside the material, $\alpha$ is the absorption coefficient of the material, $I_0$ is the light intensity just inside the material, and I is the remaining light after traveling a distance Z inside the material. To calibrate the test, a reference scan is used prior to the measurement of the film. The reference scan determines the light intensity through the ambient atmosphere and a substrate without the film. This method of determining the thickness of a film, however, requires that the substrate is transparent in the interested wavelength region, or the film is free-standing.

SUMMARY

A method of measuring the thickness of a top layer in a stack, which includes the top layer and underlying material, includes measuring the reflectance spectrum produced by the stack and determining the thickness of the top layer based on the top layer's attenuation of absorption band of the underlying material in the reflectance spectrum or its derivative. This absorption band of the underlying material is separate from the top layer's absorption band and the top layer has finite absorption in this wavelength region. A correlation between the thickness of the top layer and the strength of the absorption band of the underlying material in the reflectance spectrum or its derivative is used. The correlation is determined by identifying an absorption band of the underlying material in the reflectance spectrum or its derivative, which may be done by collecting a reflectance spectrum on a sample without the top layer or by consulting a library of absorption data. The reflectance spectra of calibration samples, each having a top layer with a different thickness, are taken. If needed, the derivative of each reflectance spectrum is then calculated. The strength of the absorption band is measured by measuring a peak height or a valley depth, or by computing a peak or a valley area, and then correlated to the thickness of the top layer for each calibration sample. Based on the correlation, any thickness of a top layer having the same composition of material as the calibration samples, may be determined based on the attenuation or the strength of the absorption band characteristic of the underlying material in the reflectance spectrum or its derivative. The underlying material may be a single layer or a composite of multiple layers.

DETAILED DESCRIPTION

In accordance with the present invention, the thickness of a layer is determined based on the layer's attenuation of a known optical characteristic of underlying material. For example, the film may attenuate the light intensity reflected off the underlying material, which may include one or more layers, leading to the reduction of a feature associated with the absorption band of the underlying material in the spectrum of the stack.

Figure 1:
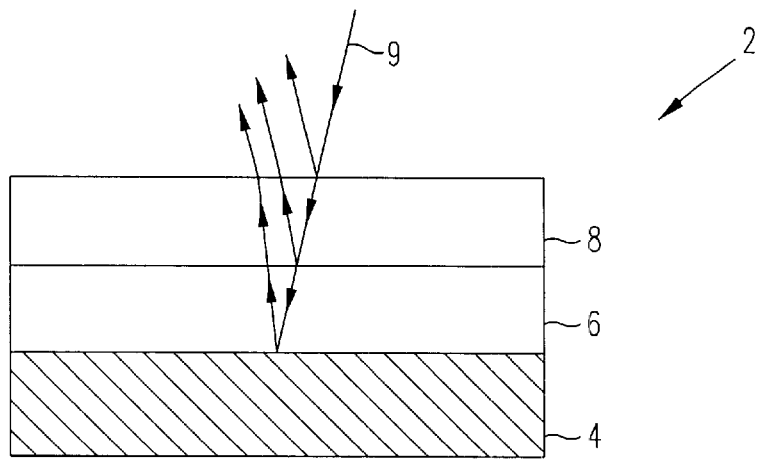
FIG. 1 shows a cross-sectional view of a stack comprising a substrate with overlying layers, the top of which is to be measured using a method in accordance with an embodiment of the present invention.

FIG. 1 shows a cross-sectional view of a stack comprising a substrate 4 with layers 6 and 8. An embodiment of the present invention is used to determine the thickness of top film 8 using an absorption band of underlying material in a reflectance spectrum of the stack 2. With knowledge of the optical characteristics of the underlying material 6, the thickness of the top film 8 may be determined simply by measuring the reflectance spectrum generated by the stack 2, for example, using an FTIR spectrometer indicated by light beams 9, and using the correlation between the strength of the absorption band of the underlying material and the thickness of top film 8.

Figure 2:
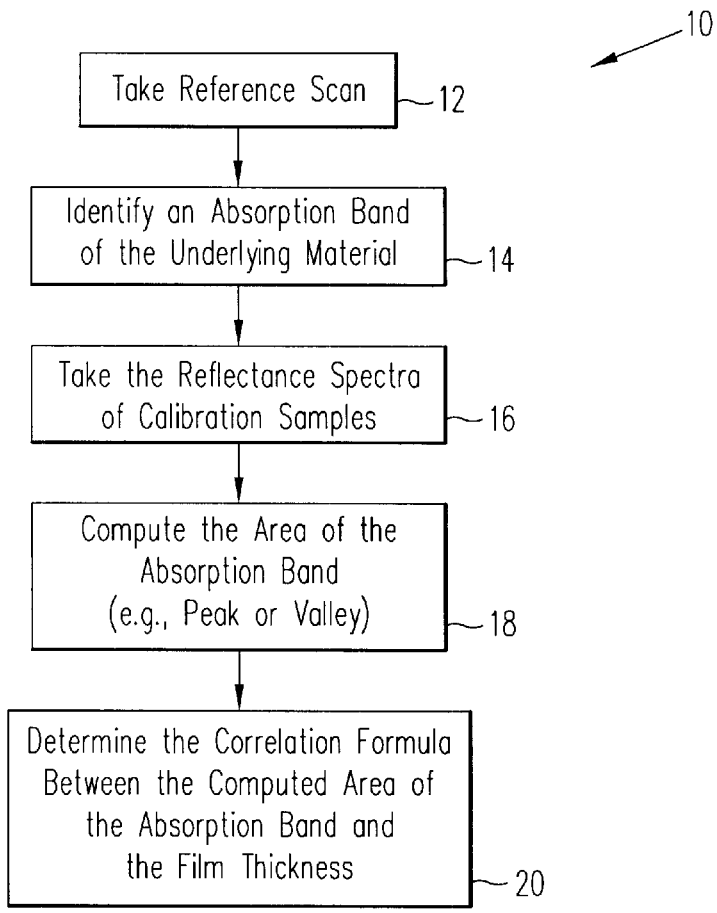
FIG. 2 is a flow chart illustrating a method of deriving the relationship between the strength of an absorption band of the underlying material in the reflectance spectrum of the stack and the thickness of the film being measured.

FIG. 2 is a flow chart 10 illustrating a method of deriving the relationship between the strength of an absorption band of the underlying material in the reflectance spectrum of the stack and the thickness of the film being measured. The absorption band is a wavelength region where the material absorbs light. Normally, the absorption band appears as a peak in a reflectance spectrum. The absorption band is an attribute of the chemical bonds present in the underlying material and different materials may have their absorption bands located at different wavelengths. Absorption bands are manifested in spectra measured in either reflection or transmission mode.

As shown in FIG. 2, a reference scan is taken to determine the intensity of the light produced by the optical measurement equipment (block 12). Because the measurements are to be taken in reflection mode, the reference scan determines the intensity of the light before striking the surface of the film. Thus, a mirror is used to reflect the particular wavelengths of light being used, e.g., for IR wavelengths, a mirror with a pure Au coating may be used.

Figure 3:
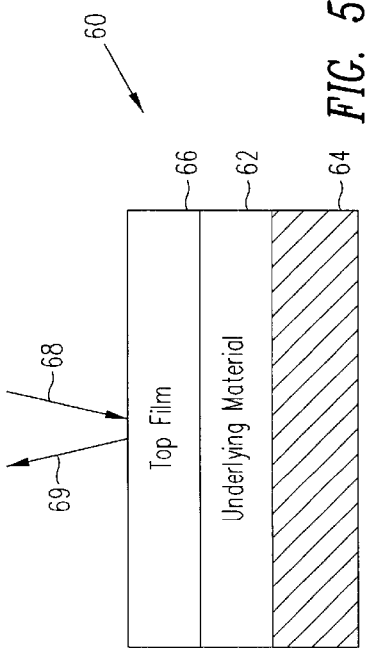
FIG. 3 shows a cross-sectional view of a sample with the underlying material layer disposed on a substrate.

Next, an absorption band of the underlying material is identified (block 14). The location of the absorption band will be dependent on the composition of the underlying material. FIG. 3 shows a cross-sectional view of a sample 50 with the underlying material layer 52 disposed on a substrate 54. To identify the absorption band in the reflectance spectrum of underlying material layer 52, a light beam is incident on 56 and reflected off 57 underlying material layer 52. The peak area of the absorption band in the reflected spectrum from the reflected light 57 may be used to quantify the strength of the absorption band of the underlying material.

Figure 4:
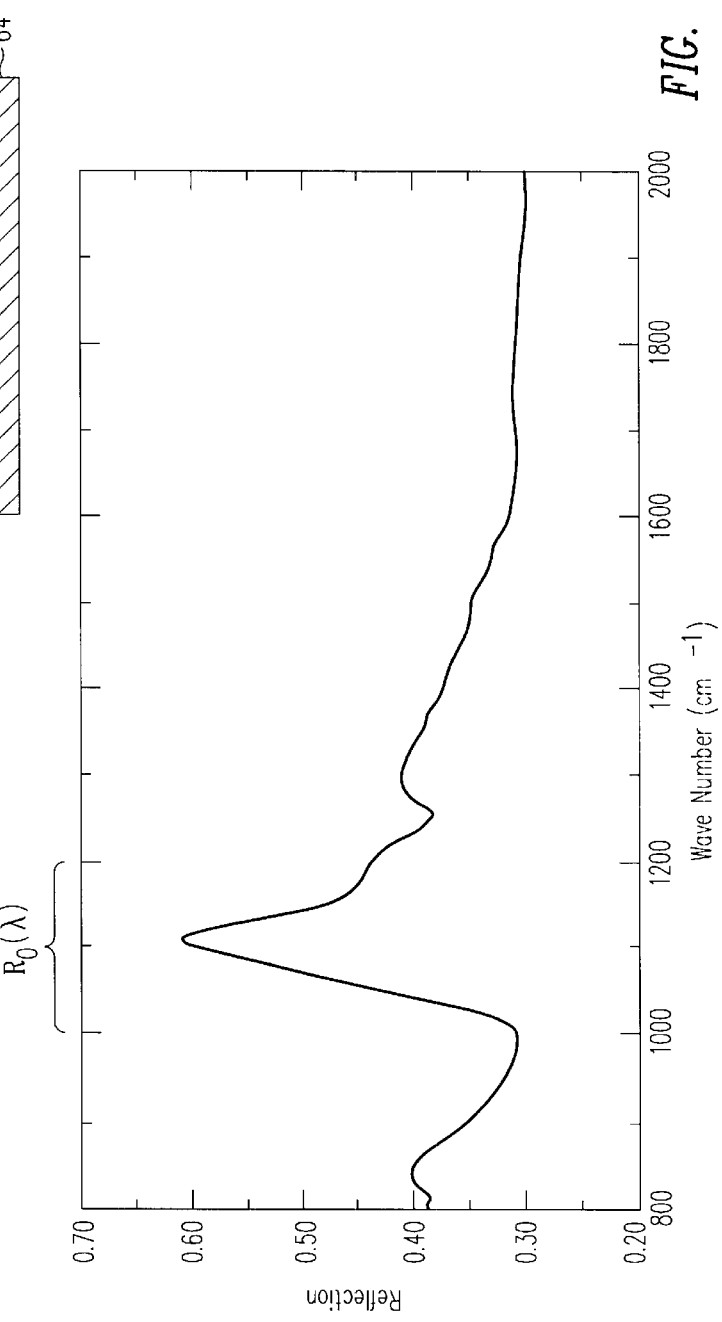
FIG. 4 is a graph showing the absorption band $R_0(\lambda)$ of the underlying material in the reflectance spectrum of the underlying material.

FIG. 4 is a graph showing a portion of the reflectance spectrum of the underlying material 52 where the absorption band of the material is marked by $R^0(\lambda)$. While it is believed that underlying material 52 may be any desired material and thickness, as well as a composite of different materials, the graph in FIG. 4 shows the reflectance spectrum of $SiO_2$ with a thickness of 0.5 $\mu$m. As shown in FIG. 4, the underlying material 52 has a characteristic feature associated with its absorption band $R_0(\lambda)$ in the IR spectrum at approximately wave numbers 1000 $cm^{-1}$ to 1200 $cm^{-1}$ (approximately 8.3 $\mu$m to 10 $\mu$m). Of course, the underlying material 52 and thickness used in sample 50 should be of the same material and thickness as the layer of underlying material 6 that will be on stack 2 being tested.

While FIGS. 3 and 4 show identifying an absorption band of the underlying material 52, it should be understood that the identification of the absorption band need not be experimentally performed as described herein every time a top film in a stack is to be tested. The identification of an absorption band is performed in order to locate the same absorption band in the reflectance spectrum when the stack is measured. The location of the absorption band may also be obtained from a library of optical information, which typically includes absorbance spectra.

In addition, as described above, it should be understood that the feature associated with the absorption band of the underlying material may appear as a valley or a combination of pack and valley in the reflectance spectrum of a multi-player stack due to the thin film interference effect. If the feature were a valley, the valley area would be correlated to the thickness of the top film. If the feature were a combination of peak and valley, either peak area or valley area, or the total area would be correlated to the thickness of the top film. It should also be understood that to enhance the absorption feature, the derivative of the reflectance spectrum would be taken and a corresponding peak and/or valley would be correlated to the top film thickness.

As shown in FIG. 2, the next step is to measure the reflectance spectra of multiple calibration samples (block 16), e.g., four calibration samples. The calibration samples are models of the stack 2 and include the same substrate material and underlying material, as well as the same material for the top film layer to be measured. The underlying material in each calibration sample is the same thickness (the thickness of underlying material 6 in stack 2). Multiple top film layers with known thicknesses are measured, e.g., eight calibration samples are used to cover the top film layer thickness range from 500 Å to 5000 Å. Of course, for increased accuracy more calibration samples may be used. The thickness of the top film layers on the calibration samples is measured independently, for example, by profilometry on an etched step on the surface or by X-ray fluorescence (calibrated).

Figure 5:
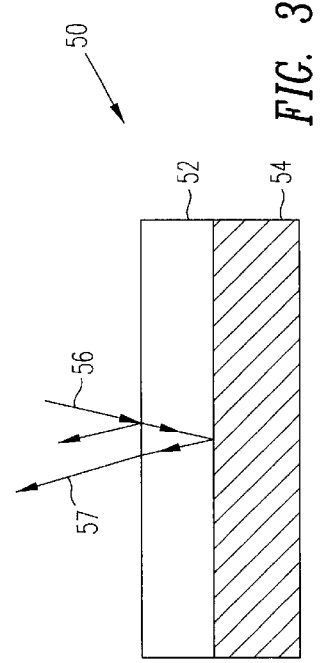
FIG. 5 shows one example of a calibration sample with an overlying top film, the underlying material layer and substrate.

FIG. 5 shows one example of a calibration sample 60 with an overlying top film 66, the underlying material layer 62 and substrate 64. A light beam is incident on 66 and reflects off 69 top film 66. Of course, part of light beam 68 penetrates top film 66 and reflects off underlying material 62. However, the amount of light that penetrates top film 66 is dependent on the thickness of top film 66. Thus, as the thickness of top film 66 increases so will the attenuation of the absorption band of underlying material 62. Consequently, the thickness of a top film 66 may ultimately be determined by the amount of attenuation of the absorption band of the underlying material in the reflectance spectra of the stack.

Figure 6:
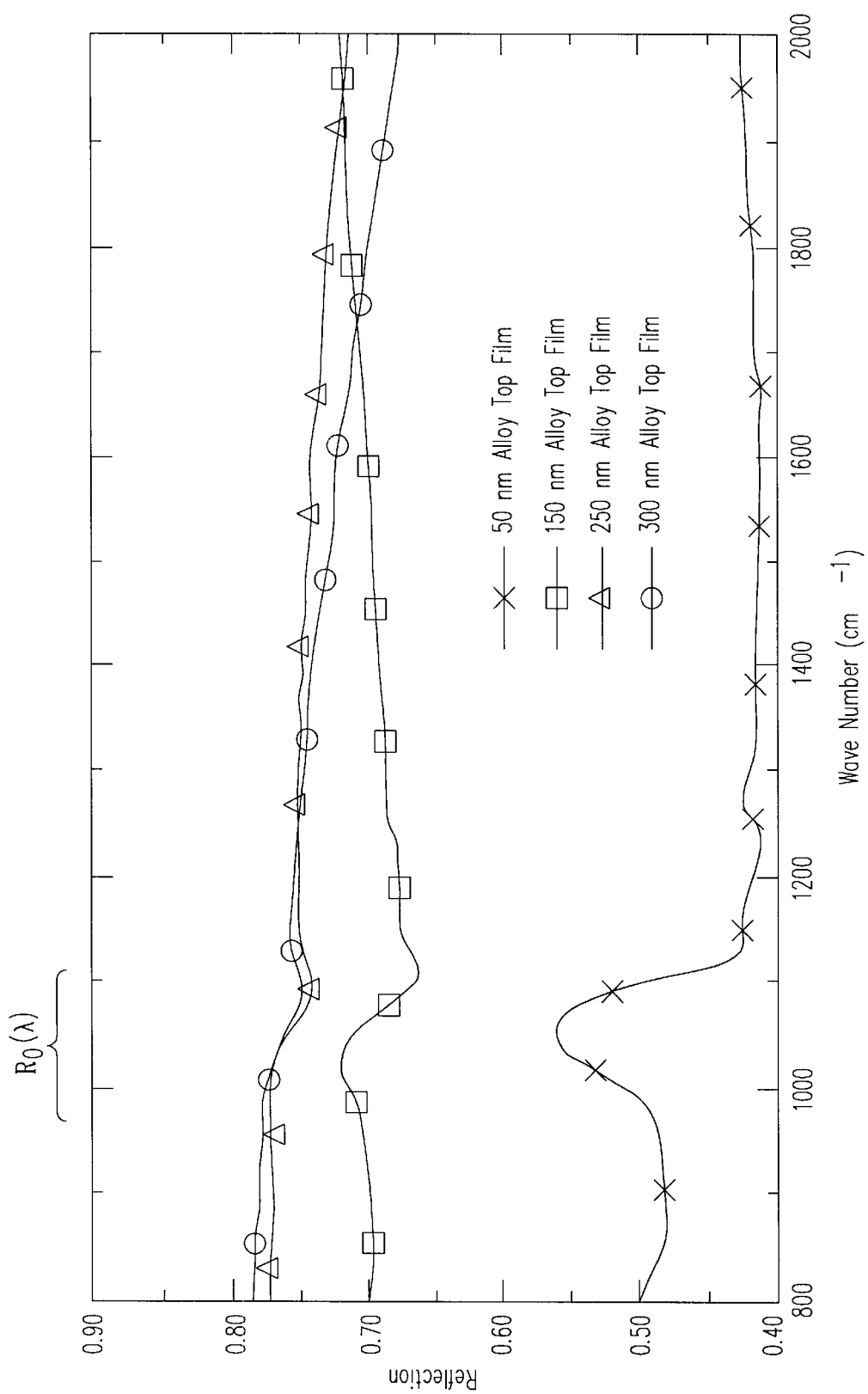
FIG. 6 is a graph showing the absorption band $R_0(\lambda)$ of the underlying material in the reflectance spectrum of the stack being attenuated by several different thicknesses of top films.

FIG. 6 is a graph showing the absorption band $R_0(\lambda)$ of the underlying material 62 being attenuated by several different thicknesses of top films 66. The top films 66 of the calibration samples 60 graphed in FIG. 6 are alloys, such as Tungsten Silicide, but the top film may be any desired material, whose own absorption bands are located in a wavelength region different from $R_0(\lambda)$ and which has finite absorptivity in the spectral region of $R^0(\lambda)$. Alloy material has a noticeable density of free charges, which leads to absorptivity across the IR spectral region. As can be seen in FIG. 6, the top film 66 attenuates the peak area of the absorption band $R_0(\lambda)$ by different amounts depending on the thickness of the top film 66.

Figure 7:
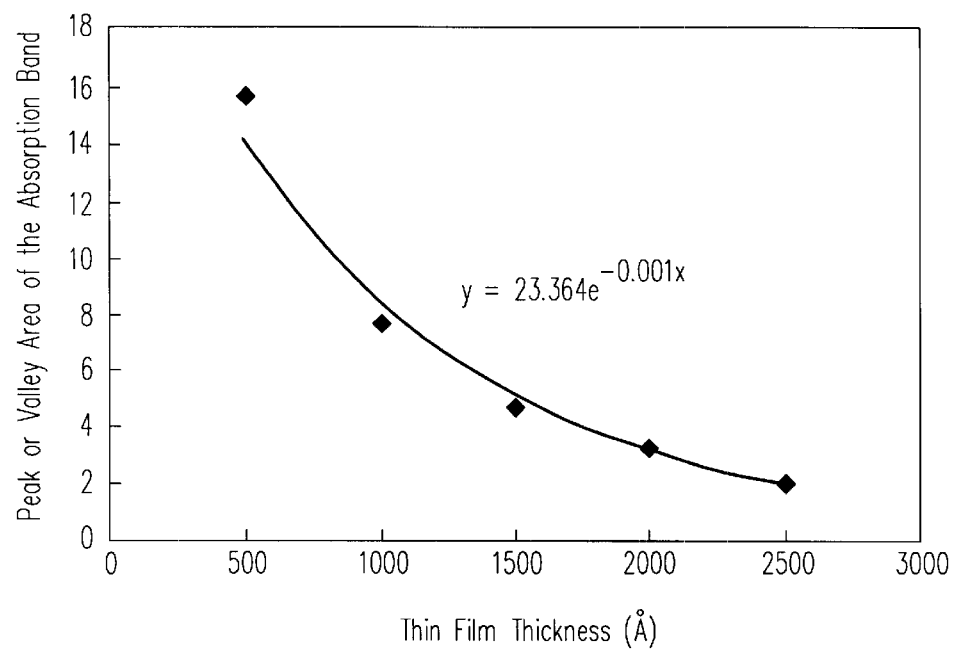
FIG. 7 is a graph showing the correlation between the peak area of the absorption band $R_0(\lambda)$ in the reflectance spectrum of the stack and the thickness of the top film.
Figure 8:
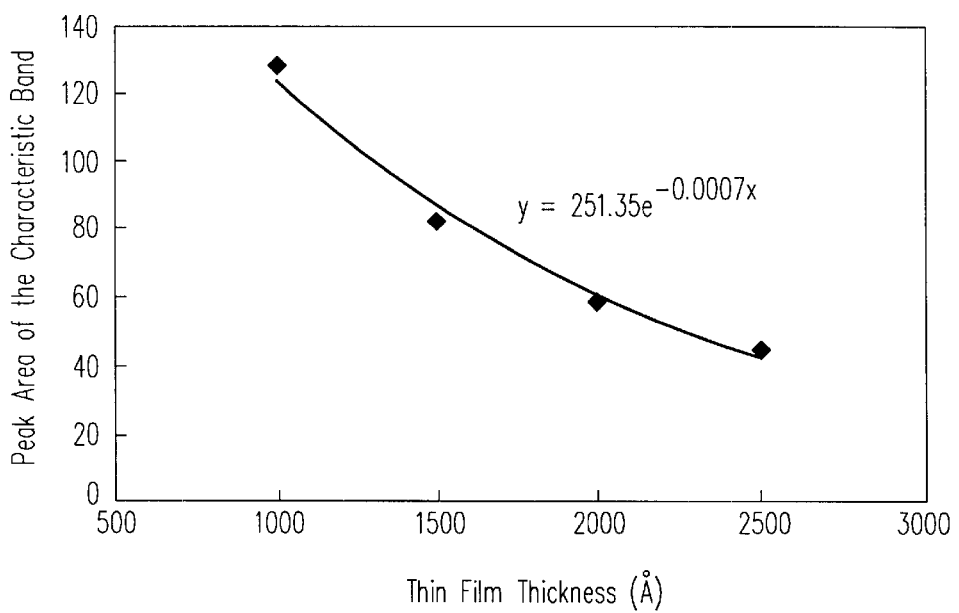
FIG. 8 is a graph showing the correlation between the peak area of the absorption band $R_0(\lambda)$ in the derivative of the reflectance spectrum of the stack and the thickness of the top film.

For each calibration sample, the strength of the absorption band $R_0(\lambda)$ in the reflectance spectrum, is computed (block 18 of FIG. 2). Thus, for example, the strength of the absorption band $R_0(\lambda)$ in the reflectance spectrum is computed as the area under the peak $R_0(\lambda)$, or by taking the first derivative of the spectrum, then computing the total areas of the peaks and valleys. With the peak area information, the correlation between the computed peak area and film thickness can then be determined (block 20). FIG. 7 is a graph showing the correlation between the strength of the absorption band $R_0(\lambda)$ of the underlying material 62 and the thickness of the alloy top film 66. The numerical fit of the data points of the calibration samples results in a curve described by the following:

$$y = 23.364 e^{-0.001x} \qquad \text{equ. 1}$$

where x represents the top film 66 thickness (in units of angstrom) and y is the peak area of the absorption band of the underlying material. If the derivative of the reflectance spectrum is used, the curve shown in FIG. 8 and which is described by:

$$y = 251.35 e^{-0.0007x}. \qquad \text{equ. 2}$$

With the correlation determined, the thickness of a top film in stack 2 (FIG. 1) may be determined within the range of the calibration samples by simply measuring the reflectance spectrum to determine the peak area of the absorption band of the underlying material, using an appropriate optical measurement instrument, e.g., an FTIR spectrometer. It should be understood that while determining the thickness of the top film includes the use of a formula, such as equation 1, the use of graphical representation of the correlation formula, i.e., the graph of FIG. 7, may also be used.

It should be understood that while the present invention is described as measuring the thickness of an alloy top film, it may be possible to determine the thickness of other types of material in the same or similar way. Of course, different materials will have different absorption bands and thus different wavelengths of light, different underlying materials, and possible different types of optical measurement instruments may be required for different materials. Further, it should be understood that the choice of the light spectrum will be dependent on both the underlying material and the composition of the top film. It is desirable to select wavelengths where the underlying material has a strong absorption band and the top film has weakly wavelength dependent absorptivity. If, for example, a spectral region is used in which the top film is nearly transparent, there will be little measurable attenuation of the absorption band of the underlying layer due to the low-absorptivity of the top film. Thus, in some instances, depending on the composition of the top film, it may be desirable to identify a different absorption band of the underlying material; or identify a new underlying material so that the top film has finite absorptivity in the spectral region of the new absorption band.

While the present invention is described in terms of measuring the reflectance spectrum, with the use of optical measurements in reflection mode, in another embodiment of the present invention, the thickness of top film 8 may be determined by measuring the attenuation of an absorption band of the underlying material 6 using optical measurements in transmission mode. With the use of transmission mode to measure the characteristic feature, the location of film 8, i.e., on top of underlying material, is not important and thus film 8 may be located between underlying material 6 and substrate 4. Possibly, film 8 may be located in the middle of underlying material 6 if underlying material 6 comprises multiple layers. For the sake of simplicity, however, the layers that are not being measured will be referred to as "underlying material."

In an embodiment where transmission mode is used, the reference scan (block 12) determines the intensity of the light through the substrate without a film. Further, the absorption band of the underlying material is identified (block 14) either experimentally using a sample without the top film or a library of absorption data. The transmission data of calibration samples is then taken (block 16) followed by computing the valley area of the absorption band of the underlying material (block 18). The correlation between the valley area of the absorption band of the underlying material and the top film thickness can then be established (block 20). From this correlation, unknown film thicknesses, which are deposited on the same underlying material and substrate (composition and thickness) as the calibration samples, can be measured.

Although the present invention is illustrated in connection with specific embodiments for instructional purposes, the present invention is not limited thereto. Various adaptations and modifications may be made without departing from the scope of the invention. For example, the identification of characteristic optical information, e.g., absorption bands, of the underlying material may be accomplished using known data from a library of information. Further, taking the reflectance spectra of calibration samples, computing the peak or valley areas, and determining the correlation between peak or valley area and film thickness need not be done every time a film measurement is to be performed. This information may be stored in a database and retrieved when performing film measurements. Moreover, it should be understood that an absorption band may appear as a peak or a valley or a local curvature change. Further, the present invention is not limited to any number or composition of layers, nor is it limited to the type of instrument or wavelengths used.

What is claimed is:

1. A method of measuring the thickness of a top layer on a stack that comprises said top layer and underlying material, the method comprising:

measuring the reflectance spectrum produced by said stack; and determining the thickness of said top layer based on the top layer's attenuation of an absorption band of said underlying material.

2. The method of claim 1, further comprising:

generating a correlation between the strength of the absorption band of said underlying layer with the thickness of the top layer; and using said correlation to determine the thickness of said top layer.

3. The method of claim 1, further comprising identifying an absorption band of said underlying material, wherein said measuring the reflectance spectrum is performed over a span of wavelengths that includes said absorption band.

4. The method of claim 3, wherein identifying an absorption band comprises measuring the reflectance spectra in a sample, said sample having the same composition of said stack absent said top layer.

5. The method of claim 4, further comprising taking a reference scan of a mirror to determine the intensity of the light to be used to measure the reflectance spectra.

6. The method of claim 3, wherein identifying an absorption band comprises using a library of absorbance information.

7. The method of claim 3, further comprising taking reflectance spectra measurements from a plurality of calibration samples, wherein each of said calibration samples have the same composition of said stack, each calibration sample having a top layer with a different thickness.

8. The method of claim 7, further comprising determining the correlation between the strength of the absorption band of said underlying material in said plurality of calibration samples and the thickness of the different thickness top layers on said calibration samples.

9. The method of claim 8, further comprising determining the strength of the absorption band of said underlying material by computing the peak area of said absorption band of said underlying material.

10. The method of claim 8, further comprising determining the strength of the absorption band of said underlying material by computing the valley area of said absorption band of said underlying material.

11. The method of claim 8, wherein determining the thickness of said top layer based on the top layer's attenuation of said absorption band of said underlying material comprises using said correlation between the strength of the absorption band of said underlying material in said plurality of calibration samples and the thickness of the different thickness top layers on said calibration samples.

12. The method of claim 1, wherein said underlying material in said stack includes more than one underlying layer, wherein the absorption band is characteristic of at least one of the underlying layers or a composite of all underlying layers.

13. A method of measuring the thickness of a top layer on a stack that comprises said top layer and underlying material, the method comprising:

measuring an optical characteristic of said stack over a spectrum of wavelengths; and determining the thickness of said top layer based on the top layer's attenuation of a known optical feature that is characteristic of said underlying material.

14. The method of claim 13, wherein the optical feature is the absorption of light by the stack, said method further comprising:

generating a correlation between the strength of an absorption band characteristic of the underlying layer with the thickness of the top layer by measuring the reflectance spectra of calibration samples; and using said correlation to determine the thickness of said top layer.

* * * * *